US007909699B2

(12) United States Patent
Parrott et al.

(10) Patent No.: US 7,909,699 B2
(45) Date of Patent: Mar. 22, 2011

(54) SCAN BASED CONFIGURATION CONTROL IN A GAMING ENVIRONMENT

(75) Inventors: Greg Parrott, Reno, NV (US); Franco Crivelli, Reno, NV (US)

(73) Assignee: IGT, Reno, NV (US)

( * ) Notice: Subject to any disclaimer, the term of this patent is extended or adjusted under 35 U.S.C. 154(b) by 224 days.

(21) Appl. No.: 10/187,102

(22) Filed: Jun. 27, 2002

(65) Prior Publication Data

US 2004/0002379 A1 Jan. 1, 2004

(51) Int. Cl.
*A63F 13/00* (2006.01)

(52) U.S. Cl. ................................ 463/42; 463/23; 463/25

(58) Field of Classification Search .............. 463/11–25, 463/40–42, 1; 235/789, 886; 345/112, 127, 345/133; 273/143 R, 292
See application file for complete search history.

(56) References Cited

U.S. PATENT DOCUMENTS 3,868,648 A * 2/1975 Levin .............................. 700/95
4,335,809 A 6/1982 Wain
4,356,391 A * 10/1982 Takeda .......................... 235/493
4,689,742 A * 8/1987 Troy et al. ........................ 463/25
4,695,053 A 9/1987 Vazquez et al.
4,764,666 A * 8/1988 Bergeron ........................ 463/25
5,043,889 A * 8/1991 Lucey ............................. 463/18
5,073,700 A * 12/1991 D'Onofrio .................... 235/436
5,110,129 A * 5/1992 Alvarez .......................... 463/18
5,212,369 A 5/1993 Karlisch et al. ............... 235/380
5,277,424 A 1/1994 Wilms
5,429,361 A 7/1995 Raven et al.
5,452,379 A * 9/1995 Poor ............................. 382/317

(Continued)

FOREIGN PATENT DOCUMENTS

CA 2273458 1/2000

(Continued)

OTHER PUBLICATIONS

Prasad, Bhavani, Marc Espin, and Richard E. Rowe, "Transaction Signature", U.S. Appl. No. 09/660,984, filed Sep. 13, 2000.

(Continued)

*Primary Examiner* — James S McClellan
*Assistant Examiner* — Allen Chan
(74) *Attorney, Agent, or Firm* — Weaver Austin Villeneuve & Sampson LLP

(57) ABSTRACT

This invention provides automated systems and methods for configuring and reconfiguring gaming machines and games playable on a gaming machine. The automated systems and methods employ a complementary gaming machine configuration device, such as a paper-based ticket, and interface operably associated with a gaming machine, such as a note acceptor or bill validator that receives and reads the paper-based ticket. The gaming machine configuration device stores game parameter configuration information in the form of configuration indicia. The indicia may contain the content required to effect configuration directly or may do so indirectly by containing a reference to a location where a set of configuration parameters have been stored. This location may reside within the gaming machine or external to it, but accessible via. a communications link. The interface reads the indicia from the configuration device, and provides a signal to a processor responsible for managing the gaming machine. The processor has access to software or memory that stores associations between the configuration indicia and configuration and reconfiguration commands for the parameters. The processor and software are then designed or configured to convert the signal provided by the interface to commands that act on appropriate mechanisms of the gaming machine to configure or reconfigure the games and/or gaming machine components responsible for expression of the affected game parameters.

43 Claims, 5 Drawing Sheets

U.S. PATENT DOCUMENTS

| | | | | | |
|---|---|---|---|---|---|
| 5,470,079 | A * | 11/1995 | LeStrange et al. | 463/25 |
| 5,494,287 | A | 2/1996 | Manz | |
| 5,586,936 | A * | 12/1996 | Bennett et al. | 463/25 |
| 5,655,961 | A | 8/1997 | Acres et al. | |
| 5,679,077 | A | 10/1997 | Pocock et al. | |
| 5,704,835 | A | 1/1998 | Dietz, II | |
| 5,761,647 | A | 6/1998 | Boushy | |
| 5,820,459 | A * | 10/1998 | Acres et al. | 463/25 |
| 6,003,013 | A | 12/1999 | Boushy | |
| 6,007,426 | A | 12/1999 | Kelly et al. | |
| 6,012,983 | A * | 1/2000 | Walker et al. | 463/20 |
| 6,048,269 | A * | 4/2000 | Burns et al. | 463/25 |
| 6,068,552 | A * | 5/2000 | Walker et al. | 463/21 |
| 6,077,163 | A | 6/2000 | Walker et al. | |
| 6,089,975 | A | 7/2000 | Dunn | |
| 6,099,408 | A | 8/2000 | Schneier et al. | 463/29 |
| 6,110,041 | A * | 8/2000 | Walker et al. | 463/20 |
| 6,113,495 | A | 9/2000 | Walker et al. | |
| 6,149,522 | A | 11/2000 | Alcorn et al. | |
| 6,162,122 | A | 12/2000 | Acres et al. | |
| 6,165,072 | A | 12/2000 | Davis et al. | 463/29 |
| 6,183,362 | B1 | 2/2001 | Boushy | |
| 6,186,404 | B1 | 2/2001 | Ehrhart et al. | 235/493 |
| 6,264,561 | B1 | 7/2001 | Saffari | |
| 6,270,409 | B1 | 8/2001 | Shuster | |
| 6,287,202 | B1 | 9/2001 | Pascal et al. | 463/42 |
| 6,293,866 | B1 | 9/2001 | Walker et al. | |
| 6,315,665 | B1 * | 11/2001 | Faith | 463/23 |
| 6,325,716 | B1 * | 12/2001 | Walker et al. | 463/17 |
| 6,343,988 | B1 | 2/2002 | Walker et al. | |
| 6,394,907 | B1 | 5/2002 | Rowe | |
| 6,450,885 | B2 | 9/2002 | Schneier et al. | |
| 6,456,977 | B1 | 9/2002 | Wang | |
| 6,478,676 | B1 | 11/2002 | Dayan | 463/17 |
| 6,511,377 | B1 * | 1/2003 | Weiss | 463/25 |
| 6,645,068 | B1 * | 11/2003 | Kelly et al. | 463/9 |
| 6,645,077 | B2 | 11/2003 | Rowe | |
| 6,685,567 | B2 | 2/2004 | Cockerille et al. | |
| 6,709,333 | B1 * | 3/2004 | Bradford et al. | 463/29 |
| 6,743,098 | B2 * | 6/2004 | Urie et al. | 463/29 |
| 6,804,763 | B1 | 10/2004 | Stockdate et al. | |
| 6,863,608 | B1 | 3/2005 | LeMay et al. | |
| 6,866,586 | B2 | 3/2005 | Oberberger et al. | |
| 7,040,987 | B2 * | 5/2006 | Walker et al. | 463/42 |
| 7,059,519 | B1 | 6/2006 | Glize | |
| 2002/0025850 | A1 * | 2/2002 | Hafezi | 463/29 |
| 2002/0072411 | A1 * | 6/2002 | Matsuura et al. | 463/37 |
| 2002/0142815 | A1 | 10/2002 | Candelore | |
| 2002/0142825 | A1 * | 10/2002 | Lark et al. | 463/16 |
| 2002/0142846 | A1 * | 10/2002 | Paulsen | 463/43 |
| 2002/0151366 | A1 * | 10/2002 | Walker et al. | 463/42 |
| 2003/0073497 | A1 | 4/2003 | Nelson | |
| 2003/0203756 | A1 | 10/2003 | Jackson | |
| 2004/0002379 | A1 | 1/2004 | Parrott et al. | |
| 2004/0147314 | A1 | 7/2004 | LeMay et al. | |
| 2007/0060302 | A1 | 3/2007 | Fabbri | |

FOREIGN PATENT DOCUMENTS

| | | |
|---|---|---|
| DE | 19905076 | 2/1999 |
| EP | 0887753 | 12/1998 |
| EP | 1039423 | 9/2000 |
| EP | 1087323 | 3/2001 |
| EP | 1136930 | 3/2001 |
| RU | 2145116 | 1/2000 |
| WO | WO 00/38089 | 6/2000 |
| WO | WO 00/76239 | 12/2000 |
| WO | WO 00/79489 | 12/2000 |
| WO | WO 01/75815 | 10/2001 |
| WO | WO 01/81093 | 11/2001 |
| WO | 02/22223 | 3/2002 |
| WO | WO 02/077935 | 10/2002 |

OTHER PUBLICATIONS

Rowe, Richard E. "Cashless Transaction Clearinghouse" U.S. Appl. No. 09/648,382, filed Aug. 25, 2000.

Examination Report from European Patent Application No. 03 736 993.1, dated Feb. 16, 2007, 3 pages.

Advisory Office Action from Russian Patent Application No. 2004138544/09, dated Apr. 26, 2007, 12 pages (with English translation).

Advisory Office Action from Russian Patent Application No. 2004138544/09, dated Oct. 13, 2007, 16 pages (with English translation).

Office Action dated Nov. 2, 2007 for U.S. Appl. No. 11/207,079.

Response to Restriction Requirement and Preliminary Amendment dated Feb. 8, 2008 for U.S. Appl. No. 11/207,079.

PTO Form 1449 (12 pages) considered Sep. 17, 2007 for U.S. Appl. No. 11/207,079.

Examination Report from European Patent Application No. 03 736 993.1, dated Feb. 16, 2007, 3 pages.

Advisory Office Action from Russian Patent Application No. 2004138544/09, dated Apr. 26, 2007, 12 pages (with English translation).

Advisory Office Action from Russian Patent Application No. 2004138544/09, dated Oct. 13, 2007, 16 pages (with English translation).

Examination Report from Australian Patent Application No. 2003237549 dated Oct. 28, 2008.

* cited by examiner

SCAN BASED CONFIGURATION CONTROL IN A GAMING ENVIRONMENT

BACKGROUND OF THE INVENTION

This invention relates to gaming machines such as slot machines and video poker machines. More particularly, the present invention relates to systems and methods that allow personnel and players to change game configurations on a gaming machine using configuration tickets and other related portable gaming machine configuration devices.

Gaming machines are becoming increasingly sophisticated. Many slot and gaming machines now employ processor driven systems that receive input from touchscreens, output information on CRT video displays and printers, drive mechanized assemblies, and communicate with a host of internal devices and external networks. One complication that occurs as a result of this sophistication is that gaming machines are no longer available in a configuration that is considered "standard". Instead, each owner is able to configure their games wish a unique set of peripherals, modes of operation, methods for handling exceptions, etc.

In a similar manner, the patrons who play games may encounter the added complexity associated with a machine that can be configured to suit their preferences. A processor driven gaming machine may selectively provide a wide array of games. For example, poker and hundreds of other games of chance are now commonly offered by a single machine. It may also offer the player some discretion in adjusting the sound volume, selecting how much of a payment is to be issued in coin versus a redeemable coupon, selecting the types of rewards they would prefer to receive as an incentive for frequently playing games, etc.

The ability to configure the setup of the gaming machine and customer preferences as just described can be extended to include the ability for each game to vary its presentation and interaction with a player according to a number of game parameters. A game parameter generally refers to a design variable or element associated with a game or a game's implementation on a gaming machine.

Often, the game parameter limits or controls interaction between the player and the game or the player and the gaming machine. For example, one parameter often established for a game is the maximum bet a player is allowed to make. In some cases, a game parameter limits or controls expression of a game on a gaming machine, such as setting game responses to different types of security or error conditions encountered while playing the game (e.g. designating a specific tilt response for the machine). Another parameter that may be associated with game expression of a game to a player on a gaming machine is the audio output and sounds encountered at various stages of playing the game (e.g. winning or a specific game event).

Each parameter may be represented or instantiated at a given time according to a limited number of settings associated to each parameter. The settings are states or options in which the parameter may exist. For the maximum bet parameter, for example, the settings may correspond to monetary or other gambling currency values. For audio output of the game via the gaming machine, each setting may correspond to a particular audio file stored in gaming machine memory.

As gaming machines and systems have evolved, the number of configurable parameters and settings that may be loaded into program memory has dramatically increased. Other configurable parameters currently available include: selecting tournament play, adjusting customer selectable preferences, setting the mode of operation, adjusting sound levels for various instances of game activity, limiting the maximum bet amount, installing/enabling communication links, selecting the proportion in which wins are paid in currency and/or tickets, selecting pay tables, etc. The total number of configurable parameters may exceed one hundred.

The settings are typically accessed via a hierarchy of menus stored within software of the gaming machine. Casino personnel and players access the settings using numeric values or navigation through predefined lists of alternatives stored within the software. A setting for each parameter is typically manually entered using an array of buttons or a touch panel. Accessing the settings in this manner requires familiarity with the menu structure and expertise in navigating the menus.

In the case of slot machines both the video display and touchscreen are absent. In this instance, a frequently used interface for configuring or reconfiguration game settings consists of a numeric button panel and a one line low resolution display. Using the numeric panel, a technician or casino personnel navigates through menus one-line at a time and one button press at a time—to change each setting. So merely searching for settings and inspecting their values requires repeated button pressing as a means to navigate through the menu structure. This process must be repeated for each parameter that needs to be inspected, entered, or changed. Loading parameter changes in this manner is highly time-consuming. For example, a full configuration of a newly installed gaming machine according to these techniques may take up to 15 minutes to complete. Given that a large casino may have thousands of gaming machines, this becomes very expensive.

To further complicate the game configuration and reconfiguration process, the ability to change or even view many of the settings is restricted only to individuals who possess proper authorization Current authorization means rely on one or more physical security keys or similar privileged devices. For example, when a game's pay table needs to be verified or changed, one key may be required to first disable game play and another key may be required to authorize and enable access to the gaming machine parameter menus. The need for authorization authentication further prolongs and complicates the game configuration/reconfiguration process.

Based on the foregoing, it should be apparent that improved systems and methods for configuring or reconfiguring a game or gaming machine would be desirable.

SUMMARY OF THE INVENTION

The present invention provides automated systems and methods for configuring and reconfiguring gaming machines and games playable on a gaming machine. The automated systems and methods employ a complementary gaming machine configuration device, such as a paper-based ticket, and interface operably associated with a gaming machine, such as a note acceptor or bill validator that receives and reads the paper-based ticket. The gaming machine configuration device stores information in the form of configuration indicia. For example, the configuration indicia may be a transcription of a game parameter configuration or an identifier such as a numeric code that is used to access a game parameter configuration stored in memory or available via a network. The interface reads the indicia from the configuration device, and provides a signal to a processor responsible for managing the gaming machine.

The processor has access to software or memory that stores associations between the configuration indicia and configuration and reconfiguration commands for the parameters. The processor and software are then designed or configured to convert the signal provided by the interface to commands that act on appropriate mechanisms of the gaming machine to configure or reconfigure the games and/or gaming machine components responsible for expression of the affected game parameters. For reconfiguration of audio output to generate different sounds for example, reconfiguration may comprise rewriting the audio file address used in a game at a particular game instance.

In one embodiment, the present invention relies on a paper-based configuration ticket that stores configuration indicia printed on the ticket. Using a configuration ticket that is recognized by gaming machine in this manner enables an automated alternative to manual gaming configuration and reconfiguration.

In applications where numerous gaming machines must be configured or reconfigured, multiple tickets may be printed for each machine or a single ticket may be re-used on multiple machines. In the former case, the ticket is stacked into a secure container internal to the gaming machine that may, be accessed for audit purposes at a later time. In the latter case, each gaming machine ejects the ticket after the parameters have been established or changed.

Automated configuration and reconfiguration in this manner may significantly expedite the game and gaming machine configuration and reconfiguration process. In one embodiment, the configuration device is read by a bill validator, an interface commonly found in gaming machines used to scan currency or redeemable coupons (constructed of paper, cotton, plastic, or other flexible media) for optical and magnetic markings.

The present invention is particularly useful for gaming systems and gaming machines such as those found in casinos. In particular, the systems and methods described herein are useful for access authorization and configuration and reconfiguration of game parameters for one or more gaming machines found in a casino.

In one aspect, the present invention relates to a gaming machine. The gaming machine comprises an interface capable of (i) receiving a gaming machine configuration device, (ii) reading configuration indicia stored on the configuration device, and (iii) outputting a signal corresponding to the indicia. The gaming machine also comprises a memory that stores an array of settings for one or more game parameters. The gaming machine further comprises a processor designed or configured to receive the signal from the interface, and in response to the signal, configure or reconfigure one or more of the game parameters in the memory according to the signal corresponding to the indicia.

In another aspect, the present invention relates to a gaming machine configuration device for use with a gaming machine. The gaming machine configuration device comprises configuration indicia indicative of setting. The indicia are capable of configuring or reconfiguring the parameter when the indicia is read by a gaming machine that is designed or adapted to read the indicia and configure or reconfigure the gaming machine or game indicated by the indicia.

In yet another aspect, the present invention relates to a method for configuring or reconfiguring a parameter of a game playable on a gaming machine. The method comprises receiving a gaming machine configuration device in an interface operably associated with the gaming machine. The method also comprises reading one or more configuration indicia from the gaming machine configuration device. The method further comprises configuring or reconfiguring a parameter of the game playable on the gaming machine in response to the configuration indicia.

In still another aspect, the present invention relates to a computer readable medium including instructions for configuring or reconfiguring a parameter of a game playable on a gaming machine. The computer readable medium comprising instructions for receiving a gaming machine configuration device in an interface operably associated with the gaming machine. The computer readable medium also comprising instructions for reading one or more configuration indicia from the gaming machine configuration device. The computer readable medium further comprising instructions for configuring or reconfiguring a parameter of the game playable on the gaming machine in response to the configuration indicia.

These and other features of the present invention will be presented in more detail in the following detailed description of the invention and the associated figures.

BRIEF DESCRIPTION OF TIE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

In one aspect, the present invention relates to a gaming machine that comprises automated and scan-based configuration/reconfiguration capability for games playable on the machine. An interface included in the gaming machine, or operably associated with the gaming machine, reads configuration indicia provided on a gaming machine configuration device. In one embodiment, the configuration device is a configuration ticket or printed ticket and the configuration indicia are printed or marked or the ticket. For example, a printer may manufacture the ticket with the settings for each parameter determined via computer input to a computer associated with the printer, or individuals may manually check boxes designating each setting for a configuration ticket that has options for each parameter. Alternately, configuration indicia may be placed on a ticket via a number or other identifier that is used to access data specifically designating which parameters are changed and to what settings.

A processor that manages a gaming machine converts the indicia provided on the device to execution commands that either directly or indirectly affect the appropriate portions of the gaming machine. Using the direct approach, the indicia can be uniquely correlated to a particular set of configuration changes. In contrast, using the indirect approach, the indicia serves as a reference or identifier that is used to locate the desired collection of configuration changes. This collection may be stored internally (within the game) or externally (accessible via. a communications link such as an ethernet connection).

Translating the configuration indicia into execution commands may include the use of software or memory that stores associations between the configuration indicia and configuration commands for the game and gaming machine. For example, the directly or indirectly obtained indicia may be a set of characters such as "ST3/G7/E9/V6". The configuration commands may interpret this character set and change the game software to play Sound Track #3 in Game #7, Event #9, at Volume level #6. When desirable, the processor also verifies configuration device authenticity.

Figure 1:
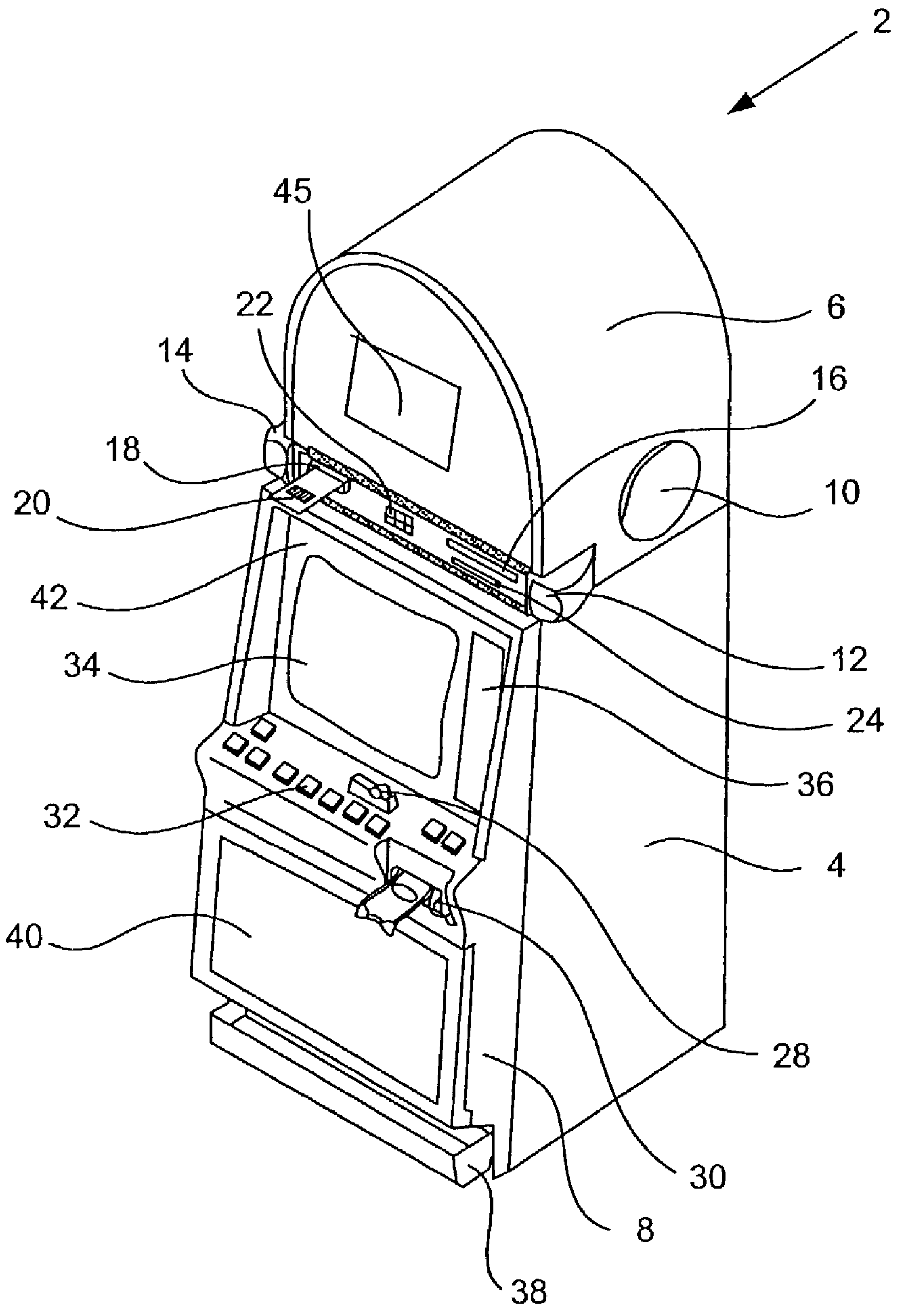
FIG. 1 is a perspective drawing of a gaming machine having a top box and other devices.

Turning first to FIG. 1, a video gaming machine 2 of the present invention is shown. Machine 2 include a main cabinet 4, which generally surrounds the machine interior (not shown) and is viewable by users. The main cabinet includes a main door 8 on the front of the machine, which opens to provide access to the interior of the machine. Typically, the main door 8 and/or any other portals which provide access to the interior of the machine utilize a locking mechanism of some sort as a security feature to limit access to the interior of the gaming machine. Attached to the main door are player-input switches or buttons 32, a coin acceptor 28, and a bill validator 30, a coin tray 38, a belly glass 40, and a monitor mask 42. Viewable through the main door is a video display monitor 34 and an information panel 36. The display monitor 34 will typically be a cathode ray tube, high resolution flat-panel LCD, or other conventional electronically controlled video monitor. Further, the video display monitor 34 may include a touch screen. The touch screen may respond to inputs made by a player touching certain portions of the screen. The information panel 36 is a back-lit, silk screened glass panel with lettering to indicate general game information including, for example, the number of coins played. The bill validator 30, player-input switches 32, video display monitor 34, and information panel are devices used to play a game on the gaming machine 2. Bill validator 30 may also be used for automated game and gaming machine configuration and reconfiguration, as will be described in further detail below. The devices are controlled by circuitry (FIG. 3) housed inside the main cabinet 4 of the machine 2. Many possible games, including traditional slot games, video slot games, video poker, keno, and lottery, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a glass panel with display 16, a ticket printer 18 which prints bar-coded tickets or configuration tickets such as configuration ticket 20 of FIG. 2B, a key pad 22 for entering player tracking information, a card reader 24 for entering a magnetic striped card or a smart card containing player tracking information or configuration information, and a video display screen 45. Further, the top box 6 may house different or additional devices than shown in the FIG. 1. For example, the top box may contain a bonus or prize reel which may be used to add bonus features to the game being played on the gaming machine. During a game, these devices are controlled, in part, by circuitry housed within the main cabinet 4 of the machine 2.

Gaming machine 2 includes a managing processor that controls and manages digital functions for gaming machine 2. This may include scanning for touch input, monetary input in the form of paper or coin currency insertion, output such as control of lights, visual displays, coin hoppers and printers game play based on player interaction, game design, and random events, configuration/reconfiguration, control, and communications with external systems via. proprietary or standardized communications link 9999 such as Ethernet. In one embodiment, the controlling processor is included within gaming machine 2 in the form of one or more conventional processors In another embodiment controlling processor networks into gaming machine 2 and is not stored within the housing of machine 2.

Understand that gaming machine 2 is but one example from a wide range of gaming machine designs on which the present invention may be implemented. For example not all suitable gaming machines have top boxes or player tracking features. Further, some gaming machines have two more game displays—mechanical and/or video. And, some gaming machines are designed for bar tables and have displays that face upwards. Those of skill in the art will understand that the present invention, as described below, can be deployed on most any gaming machine now available or hereafter developed having suitable interface and processing resources.

Having briefly discussed an exemplary gaming machine suitable for use with of the present invention, the configuration and reconfiguration aspects of the invention will now be discussed. As mentioned earlier, the present invention implements a complementary gaming machine configuration device and interface operably associated with the gaming machine to facilitate automated configuration and reconfiguration of game parameters.

In one aspect, a gaming machine configuration device is used to store game parameter and setting information related to a game or gaming machine. The device is preferably portable and may be a magnetic card, plastic card with a magnetic stripe, paper ticket with information printed thereon (herein called a configuration ticket or configuration coupon), plastic voucher or other device with information printed thereon, or any other form of portable device capable of storing configuration indicia. Although the present invention will now be primarily discussed with respect to paper tickets carried by authorized personnel, any suitable portable or transferable device capable of storing information may be suitable for use as a gaming machine configuration device of the present invention.

Figure 2A:
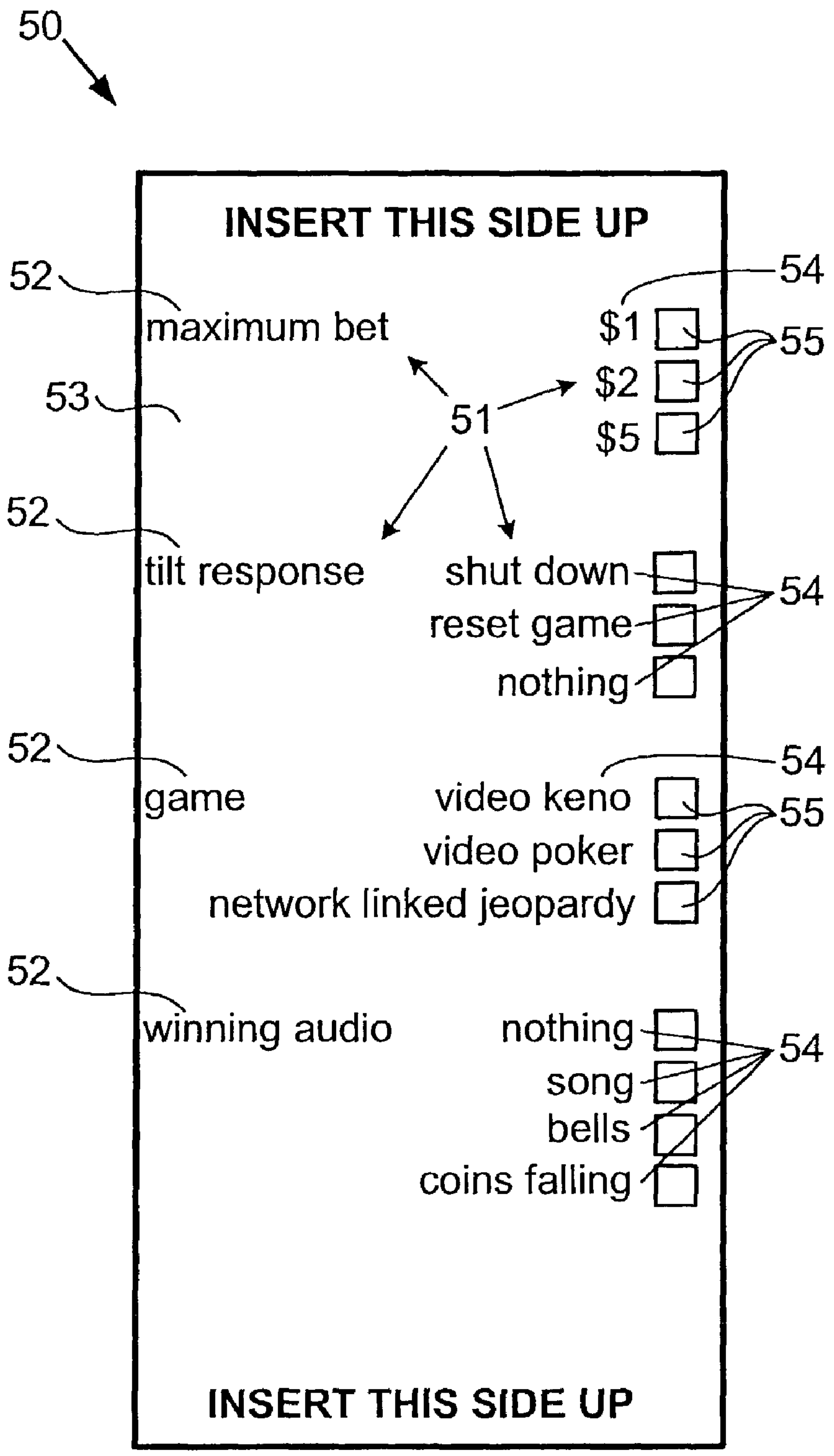
FIG. 2A illustrates a portable configuration ticket in accordance with a specific embodiment of the present invention.

FIG. 2A illustrates a portable configuration ticket 50 in accordance with a specific embodiment of the present invention. Configuration ticket 50 comprises paper 53 with an array of configuration indicia 51 printed on the facing surface.

Configuration indicia 51 include parameters 52 and settings 54 that correspond to game parameters and settings, respectively, of a game playable on a gaming machine. As shown, four parameters 52 are printed on the facing surface of ticket 50: a maximum bet, tilt response, game type, and winning audio. Alternatively, parameters 52 may include visual output associated with game presentation, a customer selectable preference, a pay table, other player interactions with the game or gaming machine such as welcoming presentation and end game presentation, parameters associated with receiving an indication from a player of a new game play, or any of the other parameters listed herein or known to one of skill in the art in the gaming industry. In one embodiment, parameters 52 may pertain to any game or gaming machine function, performance or expression not associated with calculating a game outcome.

For each parameter 52, ticket 20 includes a number of settings 54 printed on the facing surface of ticket 50. Each setting 54 refers to a different state of its respective parameter 52. As shown, maximum bet parameter 52 includes three setting options: $1, $2, and $5. Although each parameter is only shown with 3 or 4 settings, it is understood that a parameter may have any number of settings. For example, audio parameters of some games may include dozens of settings. In some cases, a parameter may have only one setting and ticket 20 may include one box 55 that allow individuals to turn the parameter on/off. In this case, a marked box turns the parameter on and an unmarked box turns it off.

An interface associated with a gaming machine receives ticket 50, e.g., a bill validator such as bill validator 30 included in gaming machine 2 of FIG. 1. Typically, the person carrying ticket 50 inserts the ticket into the interface. For bill validator 30, a light sensor detects when ticket 50, or any other paper device, has been inserted. In the case of bill validator 30, a set of traction wheels draw paper devices inside bill validator 30 upon indication by the light sensor that something has been inserted. The interface the reads indicia 51 from ticket 50. For example, bill validator 30 includes at least one optical scanner that scans linearly down a line passing through all boxes 55. In turn the optical scanner reads which of settings 54 are filled and outputs a signal corresponding to known positions of each setting. In this manner, only a single optical scanner may be used in the scanning interface to read ticket 50. As will be described below, the present invention contemplates more complex schemes for reading indicia from a configuration device.

The interface scans ticket 50 and outputs a signal corresponding to each of the selected boxes 55. The signal generally refers to a sequence of bits user, to digitally represent the configuration indicia. As will be described in further detail below, a processor in digital communication with the interface converts the signal to corresponding configuration commands for each parameter 52. Alternatively, the check boxes and/or barcode can be used to construct a reference identifier that is used to retrieve a stored set of parameters that in turn are used to convert the signal to corresponding configuration commands.

Software or memory in the gaming machine stores all the settings for all parameters playable on a gaming machine and stores associations between configuration commands and data read from ticket 50, memory, or communications interface 306. The gaming machine processor then a) receives the signal from the interfaced and in response to signal, b) accesses memory that associates data from ticket 50 with one or more parameters and settings, and c) executes configuration and reconfiguration commands specified by the memory.

Ticket 50 allows manual selection for each setting. As shown in FIG. 2A, a setting 54 for each parameter 52 includes an empty box 55. A setting 54 is then selected by filling in the corresponding box. Not all parameters 52 need be designated in this manner. Thus, ticket 20 may be used to reconfigure a limited set of parameters, e.g., one or two, for gaming machine. Boxes 55 may be manually filled in using a pencil, for example, or any other devices that allows an optical scanner to recognize a selection of a particular setting. In this case, a printer may be used to produce a blank ticket 50 that is later filled in to specify a particular configuration or reconfiguration.

In cases where configuration options must be restricted to authorized casino personnel, mechanical security keys or electronic keys may be required to initialize the configuration process. Alternatively or in conjunction with the keys, a special high security paper may be required when printing configuration tickets with restricted use. Security papers, such as those used to print currency, have special features which are difficult to counterfeit and may be detected by sensors within the bill validator.

In addition to markings such as check boxes that are optimized for printing by humans, a portion of ticket 50 may also contain barcodes or other condensed encodings that are more optimal for creation by printers and read by electronic scanning means.

In another embodiment, a completed ticket 50 may be manufactured with boxes 55 filled in using automated means such as a printer. A computer associated with the printer allows personnel to perform the parameter and setting selection process in software. The software, computer and printer simplify manufacture of ticket 50 and significantly ease the automated configuration and reconfiguration of gaming machines in an establishment. The improved positional resolution and edge definition offered by a printer would also allow a higher density of indicia to be present than could be marked by hand. For example, the software and computer allow authorized personnel to select each setting in a convenient location away from the casino floor. The software implemented on the computer may also allow storage of particular configuration sets associated with a particular game, or implementation of a game. A configuration set may include a set of parameters and settings stored in memory and easily recalled to expedite ticket 50 manufacture. Personnel may also print multiple identical tickets to allow configuration or reconfiguration of numerous gaming machines that are to be similarly changed or may use a single ticket to identically configure multiple games.

Figure 2B:
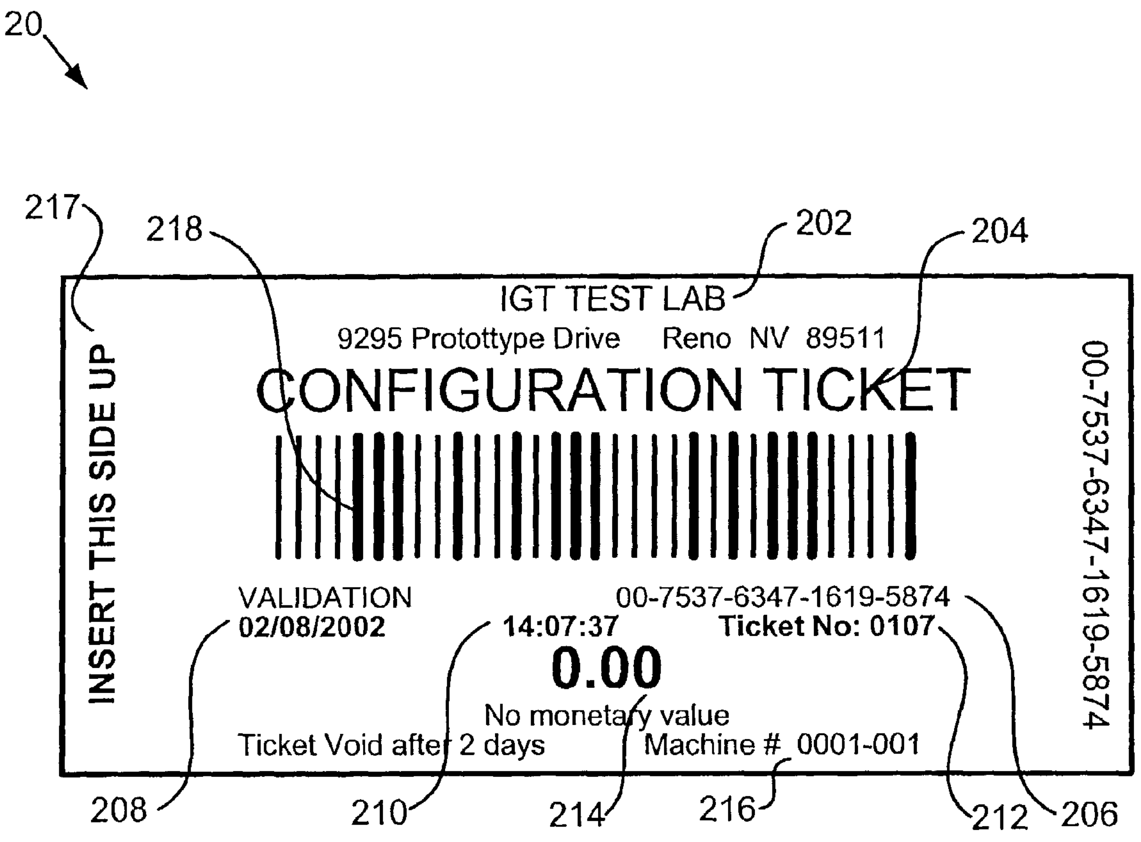
FIG. 2B illustrates a portable configuration ticket in accordance with another specific embodiment of the present invention.

FIG. 2B illustrates a portable configuration ticket 20 in accordance with another specific embodiment of the present invention. Configuration ticket 20 is a paper-based ticket with configuration indicia printed on the facing side. As shown, ticket 20 mimics a paper voucher or cashout ticker used by many casinos as an alternative to traditional portable money, such as the EZPay system provided by International Gaming Technologies of Reno, Nev. However, configuration ticket 20 has no monetary value but is intended to interface with a gaming machine to set or change game parameters on the gaming machine.

Ticket 20 displays one or more transaction information elements such as a casino identification 202, a ticket identification 204, a validation number 206, a date 208, a time 210, a ticket number 212, a value 214, and a machine identification number 216. The validation number 206 is a unique number generated for ticket 20 so that ticket 20 may be identified.

Ticket 20 also includes bar-code 218, which is readable by an interface associated with a gaming machine. Bar-code 218 store, a configuration number that specifically designates which parameters are changed, and to what settings. It may also be used to identify which of many possible configuration tickets has been inserted and interpret the location and type of markings accordingly. The interface may optically scan bar-code 218 and output a signal corresponding to bar-code 218. A processor in digital communication with the interface may convert the unrefined signal to configuration numbers. Software or memory in the gaming machine stores an array of settings and parameters for each configuration number saved in memory. In one embodiment, the gaming machine includes memory that stores a dedicated number for each combination of settings and parameters in a game. The gaming machine processor then a) receives the signal from the interface, and in response to signal, b) accesses software and memory (either internal or external to the gaming machine) that associates the configuration information with one or more parameters and settings, and c) executes configuration and reconfiguration commands specified by the memory and indicated by the configuration information stored in bar-code 218. Depending upon the number and position of sensors present in the interface, a multitude of indicia columns may be present on the configuration device.

Ticket 20 may be made with any type of paper. In one embodiment where a configuration device of the present invention is used to add security to a gaming system, the device comprises authorization information for the device and potentially for personnel carrying the device. Ticket 20 comprises authorization information that is authenticated by a gaming machine upon receipt of the ticket. In a specific embodiment, ticket 20 is made from security paper that may include specified materials in its composition or other security measures. Alternately, ticket 20 may include security features printed on one side. For the specific security measure selected, the interface and gaming machine are then de-signed with corresponding processing to a) read the security feature, and b) authenticate the security feature. Although not shown, the reverse side of ticket 20 may also include information printed thereon such as casino information, advertising, the paper manufacturer, etc.

The ability of a configuration device to function as a key, authorizing the access to and change of configurable settings may also be achieved using counterfeit resistant marketing techniques commonly found in high security notes such as currency and stocks. These techniques include: special paper or plastic substrates, ink with unique optical and/or magnetic characteristics, Intaglio printing, watermarks, security threads, embossing, Moire patterns, microprinting, taggants, and many other features.

A multitude of unique configuration tickets may be created using a combination of features such as those listed above and also by selecting staining, defacing, or otherwise permanently marking various portions of the ticket. Since a note acceptor or bill validator may obtain thousands of quantitative data measurements from the optical and magnetic sensors, a large combination of uniquely 'defaced' notes may be produced and yet still preclude creation of a counterfeit by splicing defaced portions from one ticket onto another ticket.

Ticket 20 or 50 may be produced using a printer associated with a computer not connected to a gaming machine network. As described above, this allows convenient off-line manufacture of ticket 20, or multiple tickets with the same information. In another embodiment, ticket 20 is printed by a gaming machine such as gaming machine 2 using ticket printer 18—provided the paper is provided to the gaming machine printer. In this case, gaming machine 2 is coupled to a network that allows configuration settings to be transmitted over the network to the gaming machine by a remote computer. Tickets printed in this manner may be used to configure games which are either not attached to the network or because of jurisdictional regulations, may not be reconfigured via a network directly. Use of configuration tickets in this manner allows casino personnel to roam the casino. note desirable changes based on visual observation, and effect changes without having to return to a network station.

In a specific, embodiment, ticket 20 simulates a ticket used in the EZPay ticket system. The EZPay ticket system is a gaming system that allows paper tickets to be used as an alternative to traditional portable money within the gaming system. The EZPay ticket system is fully described in commonly owned U.S. patent application Ser. No. 09,648,382 entitled "Cashless Transaction Clearinghouse", which is incorporated herein by reference. Using a network that provides communication between gaming machines and various gaming machine servers in the EZPay system, ticket 20 may be produced by any printer in the EZPay ticket system. Printers in the EZPay ticket system include printers associated with an accounting server, a verification terminal, a dedicated configuration computer, an individual gaming machine, etc. The ticket may then be used to configure any gaming machine in the system. Again, a computer able to produce the configuration indicia on the ticket may be used to transmit the configuration indicia across the network to the printer, or a computer or gaming machine operating the printer.

Configuration and reconfiguration may also be based on personal identification. Many establishments and casinos provide advanced services to frequent, preferred or other groups of players. For a frequent player, an establishment often tracks and maintains a playing history for the person and records their preferences, such as what games they frequently play and what game modes or options they favor. These individual preferences may be used as a basis for customized configuration and reconfiguration.

A player often carries some type of identification device issued by the casino, which the player provides to the gaming machine for personal identification and to receive benefits associated with their particular level of service. In one embodiment, the present invention uses a portable identification device as a configuration coupon for configuration and reconfiguration of game parameters. The portable identification device provides user identification that is associated with game parameters customized for that person. The portable identification device, such as a player tracking coupon, card, etc., is thus particular useful to implement personalized service and allow automatic game configuration and reconfiguration on an individual basis.

Here, a game configuration/reconfiguration occurs when the player provides his portable identification device to a gaming machine. The gaming machine then reads configuration indicia from the device and converts it to appropriate configuration/reconfiguration commands. For example, a player may enjoy the benefits of progressive pay bonuses on any game they play once the gaming machine is reconfigured to provide this service to the person—even though the game or particular machine was not configured for this service before the player initiated play.

Conversion from information on the personal identification device to configuration commands may occur in a variety of ways. For example, the configuration indicia may be stored directly on the personal identification device. Alternatively the device solely stores the person's identification, which is later converted to configuration commands via associations in memory that is accessible via. communications interface 306. In the latter case, the player's identification device stores a unique number (e.g., an 18 bit number) that deterministically identifies that player with their stored game preferences. Software stored on the gaming machine—or stored on the gaming machine network—may be used to convert the player's unique identification number to a set of reconfiguration commands particular to that person. This service may advantageously be provided to some establishments with existing hardware and changes only to system software. The configuration coupon in this case acts as a personal identifier that allows reconfiguration via stored software that associates between a player's identification and their configuration preferences.

A portable configuration coupon carried by a player may also allow the player to suspend game play and resume play when they want—while retaining any bonuses or other game incentives accrued in a particular game play. For example, the gaming machine may print a configuration coupon that records the state of play, credits, and bonus information. The player may then resume play by subsequently providing the coupon to any comparably equipped game. This allows a player to eat or rest, but not lose any bonuses or game incentives.

Game configuration and reconfiguration based on personal identification is not limited to individuals of a preferred status. Game configuration and reconfiguration in this manner may occur for any player status that facilitates casino service. For example, establishments may offer customized service and game parameters/settings to new players to the casino, and offer different customized service and game settings to players of another general nature. For example, players who speak and read a language other than that predominantly used in the casino may have games reconfigured to communicate in their language of preference.

Although two specific embodiments for configuration tickets are provided above, the function of loading programmable settings nay be achieved according to the present invention in many ways. One may also imbed configuration information about settings into the encoding of a security key using one or more security features mentioned above. Alternatively, information on settings may be disassociated from the security function and stored on the device. Other techniques may include preprinted information symbols other than bar-codes, alternate forms of symbols stored on a paper ticket, punched holes, handwritten text or symbols, etc.

The automated systems and methods of the present invention employ an interface complementary to the gaming machine configuration device. For example, if a magnetic card is used as the configuration device, an appropriate magnetic reader may be employed as the interface. Alternately, if a magnetic striped card acts as the configuration device, an appropriate magnetic stripe reader may be used. The interface digitally communicates with a processor that manages the gaming machine, and is capable of the following tasks: receiving a gaming machine configuration device, (ii) reading configuration indicia stored on the configuration device, and (iii) outputting a signal corresponding to the indicia.

Receiving the gaming machine configuration device implies that the configuration device and interface cooperate in some manner to communicate data therebetween. For portable configuration devices, the interface is typically stationary or coupled to a gaming machine and the configuration device is carried by authorized personnel to the interface. Personnel would then be responsible for providing the device to the interface to initiate the configuration or reconfiguration process. For the tickets 20 and 50, the interface may be a bill validator or a similar device that reads paper tickets. In one embodiment, the present invention relies on conventional bill or note acceptor technology. Many gaming systems and gaming machines built in recent years include a note acceptor that receives and verifies paper currency. Significantly, the use of a bill validator as a configuration interface enables this capability to be offered without the costs or space requirements imposed by the use of dedicated equipment. The bill validator would then receive a configuration ticket as it would other paper devices. Namely, personnel would insert the configuration ticket in the bill validator, which allows interface sensors that detect the presence of the paper device to trigger associated handling and reading mechanisms. For example, the interface may include traction rollers that draw a paper ticket inward along a known path that includes intersection with the operative area of any number of optical scanners and sensors. The optical scanners and sensors would then read configuration indicia from the ticket automatically based on insertion of the ticket and intake by mechanical means included in the interface.

One of skill in the art will appreciate different ways that various portable, devices as listed herein may be received by an associated interface. In the case of magnetic card for example, the interface may include wireless interrogation mechanisms that probe configuration indicia stored in the magnetic card. In this case, personnel is only responsible for bringing the card in proximity to a wireless sensor associated with the interface. In the case of a magnetic striped card or a smart card containing configuration indicia, receiving the card may require authorized personnel to swipe the card through a magnetic reader.

The interface is responsible for reading configuration indicia stored on the configuration device. In the case of paper-based tickets, optical scanners and sensors are well-suited for reading configuration indicia printed on the paper. Since many conventional gaming machines include a note acceptor that receives and reads paper currency, configuration indicia in accordance with one embodiment of the present invention is printed on the paper such that it aligns with predetermined locations in which the indicia may be read using established technology. Bar-code 218 of FIG. 2B is one example of this methodology.

The interface outputs a signal corresponding to indicia read from the configuration device. The interface may either transmit sensor data in a substantially unrefined form or process the data locally, using a set of algorithms that are able to recognize the configuration indicia stored on the configuration device. In the former case, the interface transmits a signal corresponding to sensor data to a processor that manages the gaming machine. For systems where digital communication is used between a gaming machine and various gaming machine peripheral devices, this implies that the interface includes a microprocessor or analog to digital technology that converts information read using an optical scanner, wireless probe, or magnetic reader to a suitable digital output. The digital communication may be sent using a proprietary or another communication protocol used between peripheral devices of a gaming machine and a gaming machine processor. In one embodiment, the interface is included within the gaming machine housing, such as the bill validator 18 included in gaming machine to of FIG. 1, and the communication of configuration information may occur across internal digital communication means, e.g., internal buses and the like. In another embodiment, the interface is a separate device that is operably coupled to the gaming machine using a serial port. In this case, proprietary and other communications protocols may be used for communication across the serial port.

Figure 3:
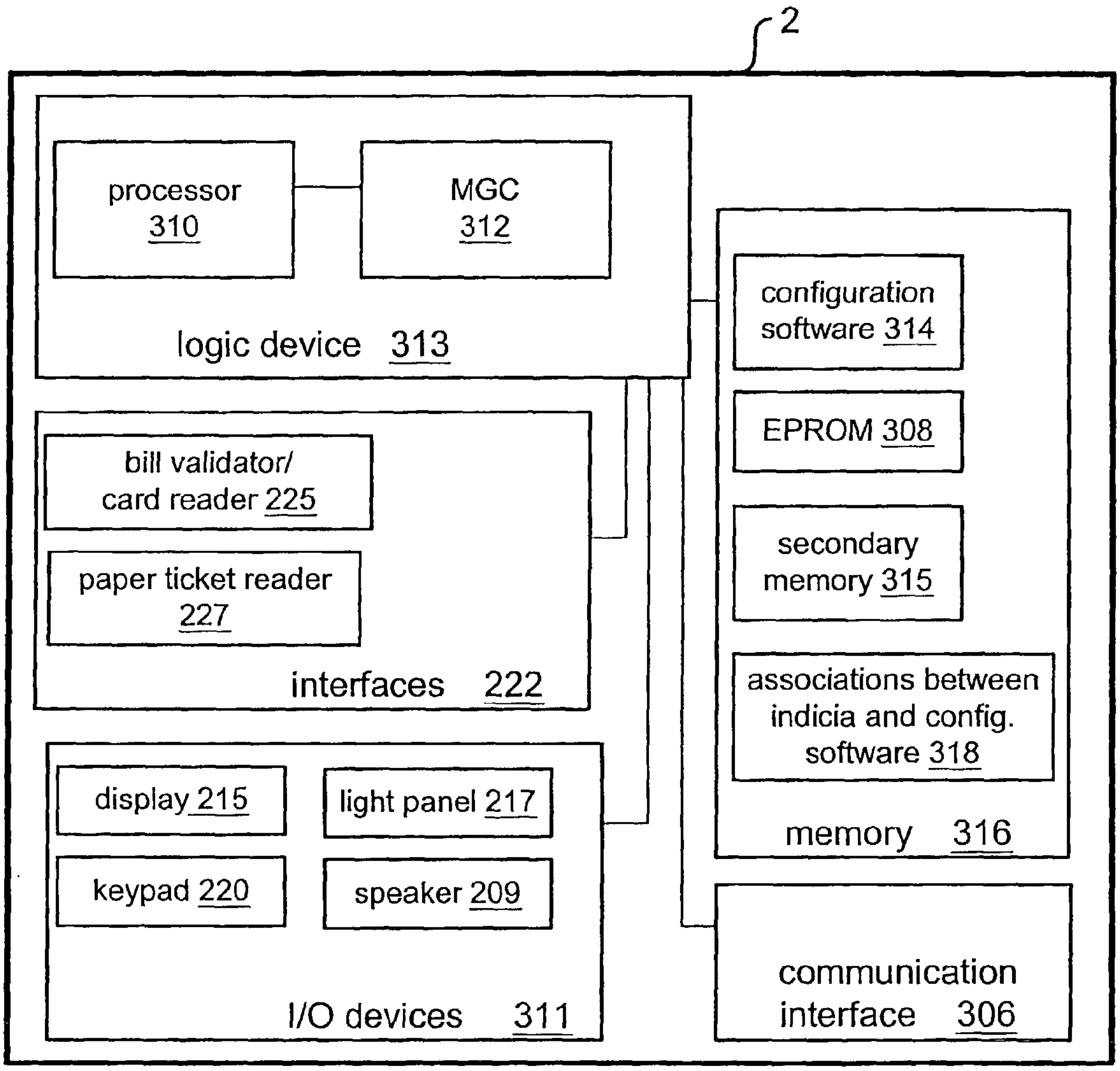
FIG. 3 is a simplified block diagram of gaming machine 2 showing processing portions of a configuration/reconfiguration system in accordance with one embodiment of the present invention.

FIG. 3 is a simplified block diagram of an embodiment of gaming machine 2 showing processing portions of a configuration/reconfiguration system in accordance with the present invention. Gaming machine 2 comprises a processor 310, interfaces 222, aid memory 316.

Processor 310 and master gaming controller 312 are included in a logic device 313 enclosed in a logic device housing. The processor 310 may include any conventional processor or logic device configured to execute software allowing various configuration and reconfiguration tasks such as: a) communicating with a remote source via communication interface 306, such as a server that stores authentication information or games, b) convert signals read by an interface to a format corresponding to that used by software or memory in the gaming machine, c) access memory to configure or reconfigure game parameters in the memory according to indicia read from the configuration device, d) communicating with interfaces 222 and various peripheral devices and I/O devices 311, and c) operating interfaces 222 such as card reader 225 and paper ticket reader 227, and operating and various peripheral devices such as display 215, key pad 220 and a light panel 216. For instance, the processor 310 may send messages containing configuration and reconfiguration information to the display 215 to inform casino personnel of configuration process. As another example, the logic device 313 may send commands to the light panel 217 to display a particular light pattern and to the speaker 209 to project a sound to visually and aurally convey configuration information or progress. Light panel 217 and speaker 209 may also be used to communicate with authorized personnel for authentication and security purposes.

Interfaces 222 includes two configuration device interfaces: card reader 225 and bill validator/paper ticket reader 227. Card reader 225 and bill validator/paper ticket reader 227 may each comprise resources for handling and processing configuration indicia such as a microcontroller that converts voltage levels for one or more scanning devices to signals provided to processor 310. In one embodiment, application software for interfaces 222 stores instructions such as how to read indicia from a portable configuration device in a memory device such as an EPROM 308, a non-volatile memory, hard drive or a flash memory.

The gaming machine 2 also includes memory 316 configured to store: 1) configuration software 314 such as all the parameters and settings for a game playable on the gaming machine, 2) associations 318 between configuration indicia read from a configuration device with one or more parameters and settings, 3) communication protocols allowing the processor 310 to communicate with interfaces 222 and I/O devices 311, 4) a secondary memory storage device 315 such as a non-volatile memory device, configured to store gaming software related information (The gaming software related information and memory may be used to store various audio files and games not currently being used and invoked in a configuration or reconfiguration), and 5) communication transport protocols such as TCP/IP, USB, Firewire, IEEE1394, Bluetooth, IEEE 802.11x (IEEE 802.11 standards), hiperlan/2, and HomeRF allowing the gaming machine to communicate with local and non-local devices using these protocols. Typically, the master gaming controller 312 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 316. For example, device drivers for different types of card readers, bill validators, displays, and key pads may all be stored in the memory 316. When one type of a particular peripheral device is exchanged for another type of the particular device, a new device driver may be loaded from the memory 316 by the processor 310 to allow communication with the device. For instance, one type of card reader in gaming machine 2 may be replaced with a second type of card reader where device drivers for both card readers are stored in the memory 316.

In some embodiments, the software units stored in the memory 316 may be upgraded as needed. For instance, when the memory 316 is a hard drive, new games, game options, various new parameters, new settings for existing parameters, new settings for new parameters, device drivers, and new communication protocols may be uploaded to the memory from the master gaming controller 104 or from some other external device. As another example, when the memory 316 is a CD/DVD drive containing a CD/DVD designed or configured to store game options, parameters, and settings, the software stored in the memory may be upgraded by replacing a first CD/DVD with a second CD/DVD. In yet another example, when the memory 316 uses one or more flash memory units designed or configured to store games, game options, parameters, settings, the software stored in the flash memory units may be upgraded by replacing one or more flash memory units with new flash memory units storing the upgraded software. In another embodiment, one or more of the memory devices, such as the hard-drive, may be employed in a game software download process from a remote software server.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks, magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 4:
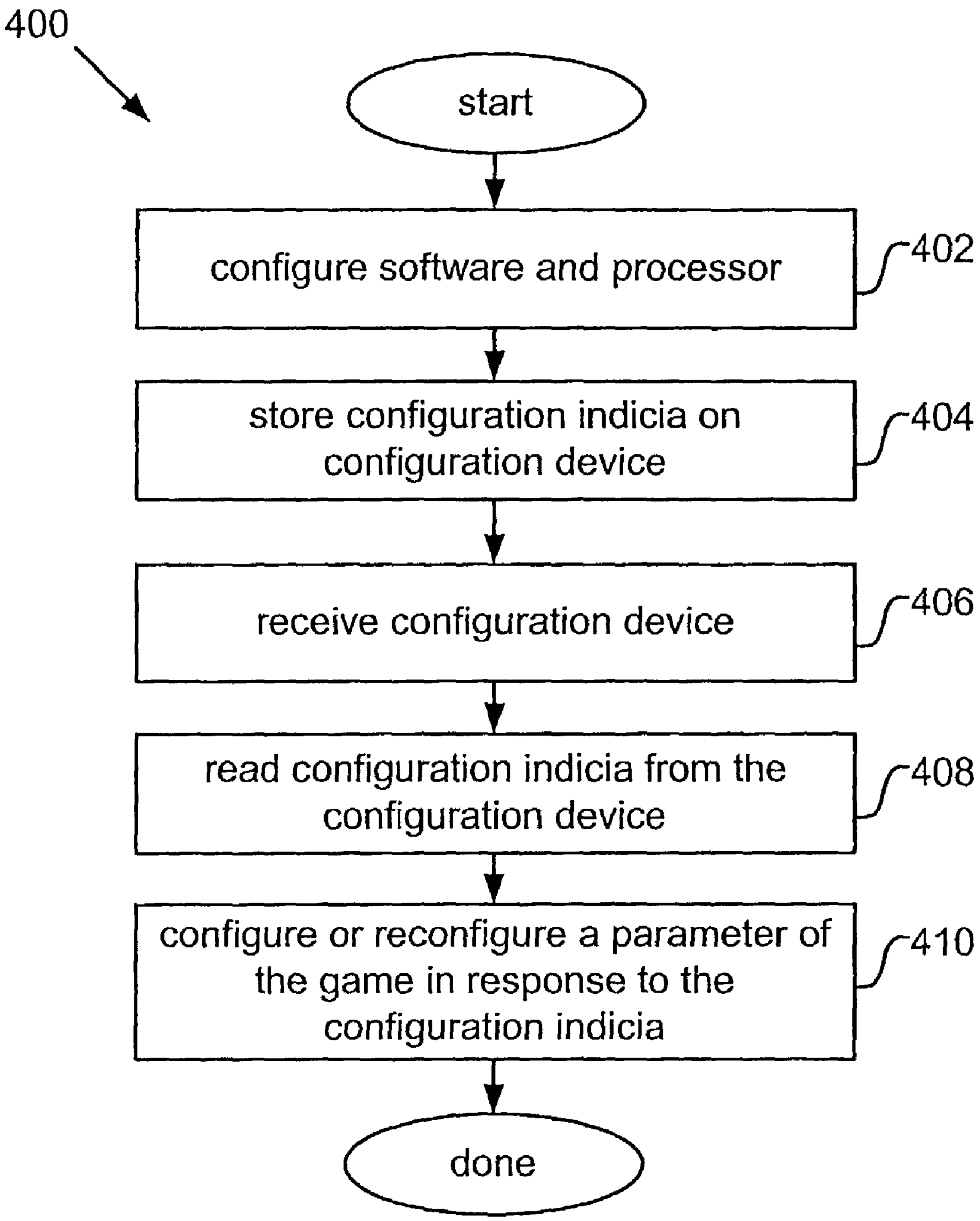
FIG. 4 illustrates a process flow for configuring or reconfiguring a parameter of a game playable on a gaming machine in accordance with one embodiment of the present invention.

FIG. 4 illustrates a process flow 400 for configuring or reconfiguring a parameter of a game playable on a gaming machine in accordance with one embodiment of the present invention. Process flow 400 may take place in any gaming machine network and gaming machine such as gaming machine 2 of FIG. 1. Processes in accordance with the present invention may include up to several additional steps not described or illustrated here in order not to obscure the present invention. While game configuration and reconfiguration will now be described as a method, those skilled in the area will recognize that the present invention encompasses a system or software having units capable of performing the actions as described below.

Process flow 400 begins by configuring software and/or a processor included in a gaming machine (402). This typically includes storing software within the gaming machine including a) game, parameter and setting information and configuration or reconfiguration execution commands, b) software that associates one or more configuration or reconfiguration commands with configuration indicia to be read from a gaming machine configuration device, and c) software that provides instructions to the processor to convert signals from an interface to appropriate configuration commands for allowing a game to be playable on a gaming machine. For example, the processor may load a saved game from memory to act as the primary game for the machine, including all the relevant execution commands potentially used during play of the game. Alternately, the configuration commands may also include setting new audio output for the gaming machine corresponding to non-game events such as player tracking services (e.g., audio corresponding to a reward for a frequent player).

Process flow 400 then proceeds with the storage of configuration indicia on a gaming machine configuration device (404). For a paper-based ticket, this usually comprises printing of the configuration indicia on the ticket. Before printing, authorized personnel may start with a high security substrate that is uniquely formulated for the casino. The key may be created by permanently masking large portions of the surface but leaving multiple small sections untouched. This allows creation of many unique keys which can be validated either by a note acceptor or bill validator, the gaming machine, or central security server associated with a gaming machine network. The configuration indicia would then be printed upon the ticket by hand or using mechanical, thermal or magnetic devices. In some cases, a printer produces the ticket within the settings for each parameter established via computer input to a computer associated with the printer. In a specific embodiment, the paper ticket stores the configuration indicia via a dedicated number or identifier that references a location (either within the game or accessible via. a communications link) where a set of configuration or reconfiguration parameters may be retrieved. Alternately, casino personnel may manually add information to the ticket if the configuration indicia is incomplete as printed (see FIG. 2A).

The configuration device is then received by an interface designed or configured to receive the device (406). Typically, personnel would be responsible for providing the configuration device to the interface. For example, personnel may insert a paper note or ticket such as currency or a configuration ticket into an entry slot. A sensor located near the front of the interface detects the paper ticket presence and reports this to the interface processor or control electronics. If the gaming machine has enabled the interface, detection of the paper ticket activates a transport mechanism consisting, for example, of motorized belts and/or rollers that draw the ticket into the interface in a lengthwise orientation at a controlled velocity. The interface then scans and reads the configuration indicia from the configuration device and provides a signal representative of the indicia to a processor that manages the gaming machine (408). For paper tickets, the interface preferably comprises one or more optical scanners that optically gather quantitative measurements of both reflected and absorbed light along a large number of points along the length of the ticket, thus reading the configuration indicia as stored on the ticket. Magnetic characteristics of a configuration device may also be measured in a similar manner.

To initiate configuration or reconfiguration of the gaming machine, personnel may be required to present authentication information to the machine. The authentication information may rely on software in the gaming machine such as a password. Alternately, authentication may rely on one or more physical security keys or similar privileged devices that enable access to the machine interior or enable configuration access. In some cases, the interface may also detect security information from the gaming machine configuration device and authorize the device, such as detecting the use of specialized paper or detecting security information stored on the ticket.

The interface produces and sends a digital communication from the interface to a processor that manages a gaming machine. One or more parameters of a game playable on the gaming machine are then configured or reconfigured in response to processing of the configuration indicia (410). To accomplish this, the processor cooperates with memory included in the gaming machine that stores software which associates the configuration indicia with one or more configuration and reconfiguration commands. Again, the configuration indicia may contain the content required to effect reconfiguration directly or contain a reference to a location where the desired information is available. The location may be within the gaming machine or external to it but accessible via. a communications link.

After the configuration device has been received, read, a signal has been provided to a processor that manages the gaming machine, and the appropriate configuration/re-configuration commands have been executed, the device may be returned to the authorized personnel from the interface—or stored by the gaming machine. For the configuration tickets 20 and 50 described above, the paper tickets may be stored in the gaming machine interior in storage facilities such as ticket stackers, drop boxes, and token dispensers. Casino personnel responsible for security monitoring may then subsequently obtain the configuration tickets for periodic validation of activity on the machine. In one embodiment, the status of the settings are printed from the gaming machine after process flow 400 is complete as a further security measure.

An advantage of the techniques described with respect to FIGS. 1-4 is that parameter configuration or reconfiguration on numerous gaming machines may be implemented in an automated manner. For paper-based tickets, the gaming machine may eject the ticket after the game parameters have been established or changed within the machine; allowing a casino service technician to insert the same configuration ticket in another machine. Thus, the same ticket may be re-used on multiple gaming machine in a network—thereby providing automated and expedited configuration or reconfiguration of multiple gaming machines using a single ticket. For magnetic card and magnetic striped card embodiments, return of the configuration device by the gaming machine may not be necessary for authorized personnel to continue configuring or reconfiguration other machines.

In another embodiment, many identical configuration tickets may be printed and an individual ticket is used for each machine to be similarly reconfigured. Since printing tickets is not an exhaustive process, creating an individual ticket for each machine to be reconfigured provides an efficient alternative to automated configuration of multiple gaming machines.

Although the foregoing invention has been described in some detail for purposes of clarity of understanding, it will be apparent that certain changes and modifications may be practiced within the scope of the appended claims. For instance, while the gaming, machines of this invention have been depicted as having gaming devices physically attached to a main gaming machine cabinet, the use of gaming devices in accordance with this invention is not so limited. For example, the display screen features which may be provided on a top box may be included in a stand alone cabinet proximate to, but unconnected to, the main gaming machine chassis.

What is claimed is:

1. A gaming machine comprising:

an interface capable of reading paper currency and (i) receiving a gaming machine configuration device in the form of a printed paper ticket that is manually fed into the interface by a person, (ii) reading configuration indicia printed or marked on the configuration device, the configuration indicia for configuring the gaming machine or a game of chance on the gaming machine, the configuration indicia printed on the paper ticket in the form of one or more selection regions each corresponding to a different configurable setting for one or more game parameters that can be configured or reconfigured, at least one of the selection regions printed or marked to indicate a selection of the one or more configurable settings to be configured or reconfigured, and (iii) outputting, solely based on the one or more selection regions, a signal corresponding to the printed or marked selection regions of the configuration indicia on the paper ticket, wherein each of the printed or marked selection regions read by said interface is described by text; and (iv) ejecting the configuration device from the interface after one or more of the game parameters have changed;

a memory storing settings providing states for one or more game parameters of the gaming machine or the game of chance on the gaming machine, the game parameters controlling operation of the gaming machine or operation of the game of chance on the gaming machine; and a processor designed or configured to receive the signal from the interface, and in response to the signal, configure or reconfigure one or more of the game parameters in the memory according to one or more of the settings as indicated by the printed or marked selection regions of the configuration indicia on the paper ticket, thereby configuring or reconfiguring the one or more game parameters based on the printed or marked configuration indicia on said paper ticket wherein the one or more of the game parameters include a customer selectable preference, a game mode of operation, a sound level for a game activity, a maximum bet amount, a pay table, or a tilt response.

2. The gaming machine of claim 1 wherein the memory stores an association between one of the settings and the signal corresponding to the indicia.

3. The gaming machine of claim 1 wherein the interface is capable of receiving, reading and validating the printed paper ticket.

4. The gaming machine of claim 3 wherein the printed paper ticket includes a security paper.

5. The gaming machine of claim 3 wherein the interface comprises an array of light sensors that read the configuration indicia from predetermined locations on the printed paper ticket.

6. The gaming machine of claim 1 wherein:

a) the gaming machine configuration comprises authorization information; and b) the memory or interface comprises instructions for verifying the authorization information.

7. The gaming machine of claim 1 further comprising an authentication mechanism that authenticates the identity of a person providing the gaming machine configuration to the interface.

8. The gaming machine of claim 1 further including a storage device that stores the configuration device within the gaming machine after one or more of the game parameters have changed.

9. The interface of claim 1 wherein the interface is mechanically disposed within a housing of the gaming machine.

10. A gaming machine configuration device for use with a gaming machine, the gaming machine configuration device in the form of a printed paper ticket having configuration indicia printed or marked thereon, the configuration indicia providing configuration of the gaming machine or a game of chance playable on the gaming machine including being printed or marked on the paper ticket in the form of one or more selection regions each corresponding to a different setting for one or more game parameters, at least one of the selection regions printed or marked to be indicative of a selection of one or more settings providing one of a plurality of states for a parameter for the gaming machine or the game of chance playable on the gaming machine, the indicia capable of configuring or reconfiguring the parameter according to the printed or marked selection regions of the configuration indicia on the paper ticket when the indicia is read by a gaming machine that is designed or adapted to read the printed or marked indicia when the printed paper ticket is manually provided by a person to the gaming machine in the game machine paper currency validator and configure or reconfigure the gaming machine or game of chance indicated by the indicia, wherein the parameter refers to a design variable or element associated with a game or a game implementation on a gaming machine wherein one or more of the design variables or elements is associated with implementation of a customer selectable preference, a game mode of operation, a sound level for a game activity, a maximum bet amount, a pay table, or a tilt response.

11. The gaming machine configuration device of claim 10 wherein the device is capable of insertion into the gaming machine paper currency validator.

12. The gaming machine configuration device of claim 10 wherein the device comprises authorization information.

13. The gaming machine configuration device of claim 10 wherein the game parameter affects interaction between the player and the game or the player and the gaming machine.

14. The gaming machine configuration device of claim 10 wherein the device allows the player to suspend game play.

15. The gaming machine configuration device of claim 10 wherein the device allows configuration and reconfiguration based on personal identification of a player.

16. The gaming machine configuration device of claim 15 wherein the personal identification is stored as a number that associates the player with a set of reconfiguration parameters.

17. The gaming machine configuration device of claim 10 wherein the configuration indicia provides a reference to a location where the configuration and reconfiguration commands reside.

18. The gaming machine configuration device of claim 17 wherein the location is on the gaming machine.

19. A method for configuring or reconfiguring a parameter of a game playable on a gaming machine, the method comprising:

(a) receiving a gaming machine configuration device in an interface operably associated with the gaming machine for validating paper currency, the gaming machine configuration device including a printed paper ticket having configuration indicia printed or marked thereon which is manually provided by a person to the interface, the configuration indicia providing configuration of the gaming machine or the game playable on the gaming machine, the configuration indicia printed or marked on the paper ticket in the form of one or more selection regions each corresponding to a different setting for one or more game parameters, at least one of the selection regions printed or marked to indicate a selection of the one or more settings, wherein the one or more of the game parameters include a customer selectable preference, a game mode of operation, a sound level for a game activity, a maximum bet amount, a pay table, or a tilt response;

(b) reading the printed or marked configuration indicia from the gaming machine configuration device; and (c) configuring or reconfiguring the parameter of the game playable on the gaming machine in response to the configuration indicia according to the printed or marked selection regions of the configuration indicia on the paper ticket, the parameter controlling operation of the gaming machine or the game playable on the gaming machine, the settings providing states for the parameter.

20. The method of claim 19 further comprising storing software within the gaming machine that associates one or more configuration or reconfiguration commands with the configuration indicia read from the gaming machine configuration device.

21. The method of claim 19 wherein the configuration indicia provides a reference to a location where the configuration and reconfiguration commands reside.

22. The method of claim 21 further comprising authorizing the gaming machine configuration device.

23. The method of claim 19 further comprising manufacturing the printed paper ticket using a printer.

24. The method of claim 23 wherein the interface comprises an optical scanner configured to optically read the configuration indicia from the gaming machine configuration device.

25. The method of claim 19 further comprising ejecting the gaming machine configuration device from the interface after the parameters have been configured or reconfigured.

26. The method of claim 25 further comprising performing (a)-(c) on a second gaming machine.

27. The method of claim 19 further comprising storing the gaming machine configuration device within the gaming machine after the parameter has been configured or reconfigured.

28. The method of claim 19 wherein configuring or reconfiguring a parameter comprises setting a new audio output for the gaming machine corresponding to a particular event in a new game.

29. The method of claim 19 wherein setting or changing a parameter comprises setting or changing a tilt response of the gaming machine.

30. The method of claim 19 wherein the configuration indicia is stored as a personal identification for a player.

31. The method of claim 19 wherein the configuration indicia is stored as a reference that identifies a player.

32. The method of claim 31 wherein the personal identification is stored as a number that associates the player with a set of reconfiguration commands for that player.

33. A computer readable medium including instructions for configuring or reconfiguring a parameter of a game playable on a gaming machine, the computer readable medium comprising:

(a) instructions for receiving a gaming machine configuration device in an interface operably associated with the gaming machine, the gaming machine configuration device including a printed paper ticket having configuration indicia printed or marked thereon which is manually provided by a person to the interface, the configuration indicia providing configuration of the gaming machine or the game playable on the gaming machine, the configuration indicia printed or marked on the paper ticket in the form of one or more selection regions each corresponding to a different setting for one or more game parameters, at least one of the selection regions printed or marked to indicate a selection of the one or more settings, wherein the one or more of the game parameters include a customer selectable preference, a game mode of operation, a sound level for a game activity, a maximum bet amount, a pay table, or a tilt response;

(b) instructions for reading one or more of the printed or marked configuration indicia from the gaming machine configuration device; and (c) instructions for configuring or reconfiguring the parameter of the game playable on the gaming machine in response to the printed or marked configuration indicia according to the marked selection regions of the configuration indicia on the paper ticket, the parameter controlling operation of the gaming machine or the game playable on the gaming machine, the settings providing states for the parameter.

34. The gaming machine of claim 1, wherein the marked selection regions of the configuration indicia marked on the ticket include one or more check boxes.

35. The gaming machine configuration device of claim 10, wherein the marked selection regions of the configuration indicia marked on the ticket include one or more check boxes.

36. The method of claim 19, wherein the marked selection regions of the configuration indicia marked on the ticket include one or more check boxes.

37. The gaming machine of claim 1, wherein the marked selection regions of the configuration indicia on the paper ticket include manual writing.

38. The gaming machine configuration device of claim 10, wherein the marked selection regions of the configuration indicia on the paper ticket include manual writing.

39. The gaming machine configuration device of claim 10, wherein the marked selection regions of the configuration indicia on the paper ticket include text.

40. The method of claim 19, wherein the marked selection regions of the configuration indicia on the paper ticket include manual writing.

41. The method of claim 19, wherein the marked selection regions of the configuration indicia on the paper ticket include text.

42. The computer readable medium of claim 33, wherein the marked selection regions of the configuration indicia on the paper ticket include manual writing.

43. The computer readable medium of claim 33, wherein the marked selection regions of the configuration indicia on the paper ticket include text.

* * * * *